United States Patent [19]

Yamada et al.

[11] Patent Number: 4,635,792

[45] Date of Patent: Jan. 13, 1987

[54] DISC PACKAGE

[75] Inventors: Masaki Yamada, Tokyo; Mitsuru Yokoi; Kazuhiro Oishi, both of Shizuoka, all of Japan

[73] Assignee: CBS/Sony Records Inc., Shizuoka, Japan

[21] Appl. No.: 722,370

[22] Filed: Apr. 12, 1985

[30] Foreign Application Priority Data

Apr. 13, 1984 [JP] Japan .............................. 59-54529
Sep. 13, 1984 [JP] Japan ............................. 59-147162

[51] Int. Cl.$^4$ ............................................. B65D 85/30
[52] U.S. Cl. .............................. 206/310; 206/45.23; 206/312; 206/444
[58] Field of Search ............... 206/45.23, 45.24, 45.26, 206/309, 310, 311, 312, 444, 472, 477

[56] References Cited

U.S. PATENT DOCUMENTS

| | | | |
|---|---|---|---|
| 3,109,539 | 11/1963 | Turoff | 206/310 |
| 3,825,112 | 7/1974 | Schumaker et al. | 206/310 |
| 3,876,134 | 4/1975 | Rice et al. | 206/312 |
| 3,949,872 | 4/1976 | Paudras | 206/310 |
| 4,049,119 | 9/1977 | Wilson | 206/472 |
| 4,315,571 | 2/1982 | Danne | 206/312 |
| 4,327,831 | 5/1982 | Inaba et al. | 206/310 |
| 4,379,507 | 4/1983 | Llabres | 206/309 |
| 4,499,996 | 2/1985 | Coyle | 206/444 |

FOREIGN PATENT DOCUMENTS

| | | | |
|---|---|---|---|
| 561850 | 9/1932 | Fed. Rep. of Germany | 206/310 |
| 749720 | 6/1933 | France | 206/310 |
| 147868 | 9/1983 | Japan | 206/309 |

*Primary Examiner*—William I. Price
*Assistant Examiner*—David T. Fidei
*Attorney, Agent, or Firm*—Lewis H. Eslinger; Alvin Sinderbrand

[57] ABSTRACT

A disc package for enclosing a record disc and which is capable of opening to permit the disc to be withdrawn therefrom for insertion into a disc player comprises a body for accommodating the record disc, a cover, and a cover hinge pivotably connecting the cover to the body. The body comprises a first part adjacent to the cover hinge, a second part spaced away from the cover hinge, and a body hinge pivotally connecting the first and second body parts. A central holding member formed on the first body part is engageable within a center hole formed in the disc when the package is closed around the disc. A peripheral holding member is formed on a side of the second body part remote from the body hinge for gripping the outer edge of the disc. The disc package thus can be moved between a closed position wherein it securely grips, encloses and protects the disc and an open position wherein the disc is free of the cover, of the first body part and of the central holding member and is held only by the second body part, including the peripheral holding member, so that it is easily inserted into a disc player.

11 Claims, 15 Drawing Figures

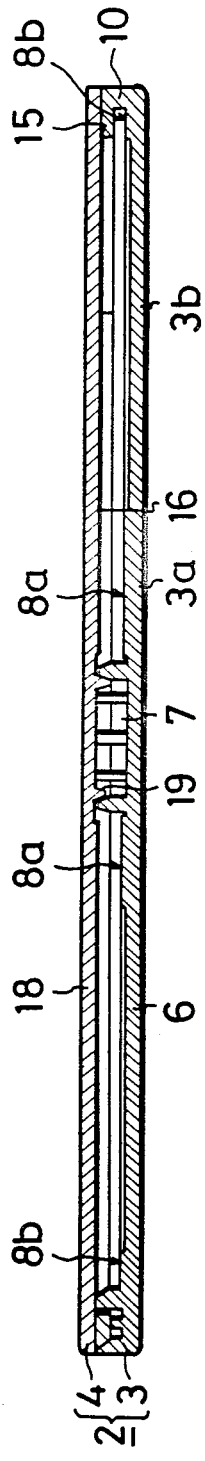
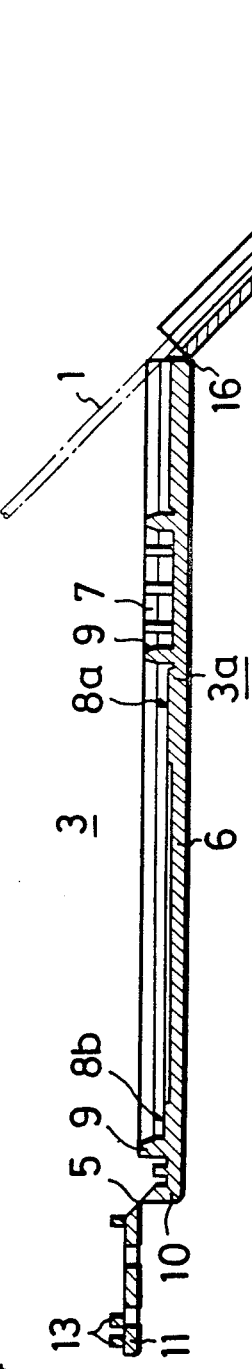
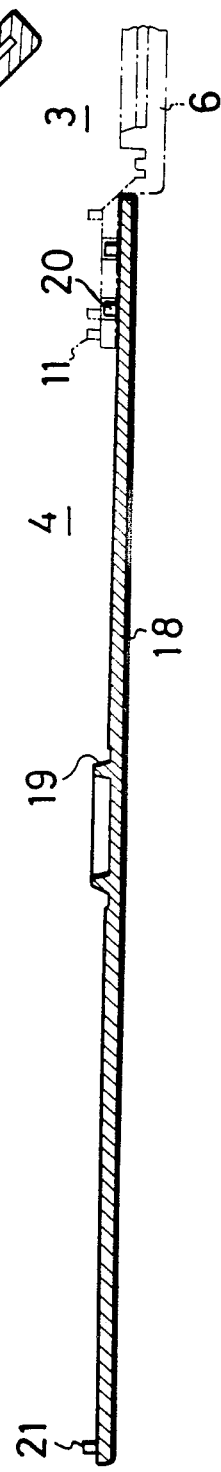
FIG. 3
FIG. 4
FIG. 5

DISC PACKAGE

BACKGROUND OF THE INVENTION

1. Field of the Invention

This invention relates to a disc package and, more particularly, to a novel and highly-effective package for storing a "compact" audio disc of the type on which PCM (pulse code modulated) signals are recorded and which is designed to be read out by a laser beam.

2. Description of the Prior Art

A compact digital audio disc from which signals are reproduced by means including a laser beam typically measures some 120 mm in diameter and 1 mm in thickness. In comparison to those measurements, a conventional package for accommodating the disc is relatively large. For example, a popular package now on the market comprises three pieces, namely a base plate, a disc support member and a cover rotatably engaged with the base plate, and measures about 143 mm by 125 mm by 10.4 mm and volumetrically is larger than the disc by an order of magnitude. The manufacture of this package requires, among other equipment, three molding dies. This means that the manufacturing cost is relatively high.

Further, the cover of the conventional package is not opened easily (i.e., rotated away from the base plate) by a single hand, nor is a disc easily withdrawn from the open package by a single hand. Accordingly, it is difficult and even dangerous for the driver of a car, for example, to attempt to load a disc which is housed in such a package into a disc player while the car is in motion.

Also, when the disc is removed from the conventional package, there is a risk of leaving finger marks or smudges on the disc surface. Such finger marks or smudges may make it impossible for the laser beam used in reading out the digital signals recorded on the disc to reproduce the signals faithfully.

OBJECTS AND SUMMARY OF THE INVENTION

An object of the invention is to provide a disc package that remedies the problems of conventional disc packages indicated above and, in particular, that is volumetrically much smaller than a conventional disc package, that is inexpensive to manufacture, that is easy to open using only one hand, that avoids the danger of placing finger marks or smudges on the disc, and that facilitates loading of the disc into a disc player.

Another object of the invention is to provide a disc package that minimizes the risk of scratching the disc in the package, that holds or grips the disc securely when the package cover is opened, that is small and thin but rigid and strong, and that is ideally suited for storing compact discs in a car or other vehicle.

In accordance with one aspect of the invention, there is provided a disc package for enclosing a record disc formed with a center hole, the disc package being capable of opening to permit the disc to be withdrawn therefrom for insertion to a disc player and comprising: a body for accommodating the record disc; a cover; and cover hinge means connecting the cover to the body for relative pivoting movement about a first axis; the body comprising a first part adjacent to the cover hinge means, a second part spaced away from the cover hinge means, body hinge means connecting the first and second body parts for relative pivoting movement about a second axis, a central holding member formed on the first body part for engaging the center hole of the disc, and a peripheral holding member formed on a side of the second body part remote from the body hinge means for gripping an outer edge of the disc; whereby the disc package can be moved between a closed position wherein it securely grips, encloses and protects the disc and an open position wherein the disc is free of the cover, of the first body part and of the central holding member and is held only by the second body part, including the peripheral holding member, so that it is easily inserted into a disc player.

BRIEF DESCRIPTION OF THE DRAWINGS

A better understanding of the objects, features and advantages of the invention can be gained from the following detailed description of the preferred embodiments thereof, in conjunction with the appended figures of the drawings, wherein:

FIG. 3 is a cross-sectional view of the disc package of FIG. 1, the disc package being shown in the closed position;

FIG. 4 is a cross-sectional view of a main body portion of the disc package of FIG. 1, showing an articulation of which it is capable;

FIG. 5 is a cross-sectional view of a cover portion of the disc package of FIG. 1 in the open position;

FIG. 12 is a fragmentary bottom-plan view of a cover portion of the disc package of FIG. 10;

FIG. 13 is a fragmentary bottom-plan view of another part of the cover of FIG. 12;

DESCRIPTION OF THE PREFERRED EMBODIMENTS

Figure 1:
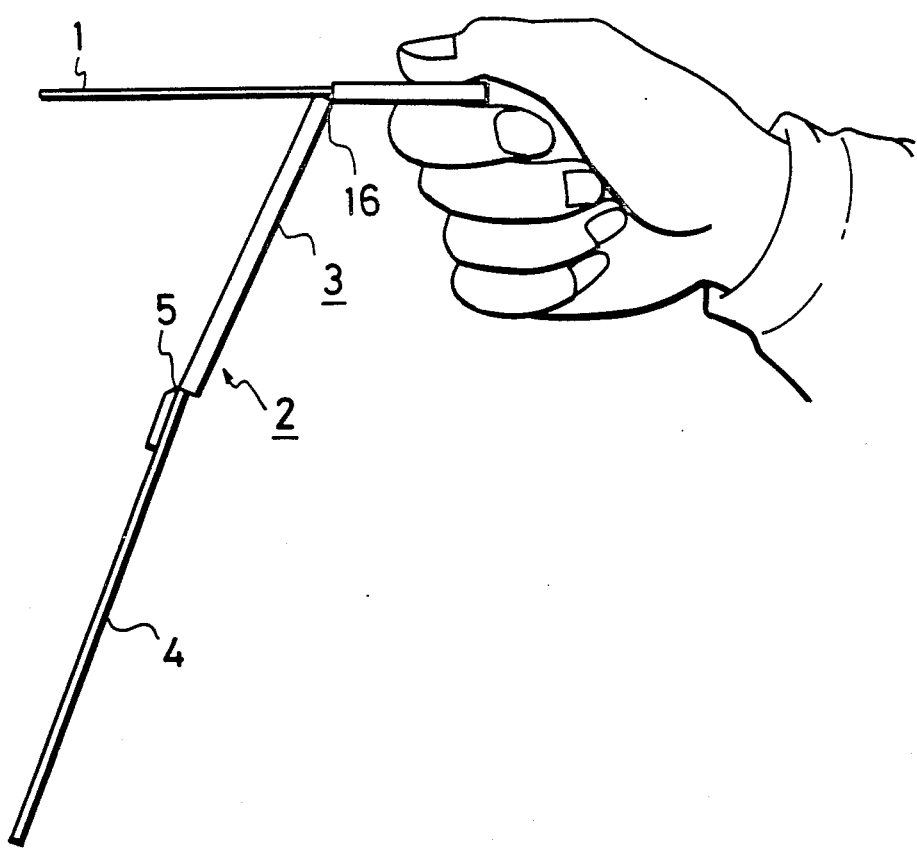
FIG. 1 is a view in side elevation of a first embodiment of a disc package according to the invention, the disc package being shown in the open position and holding a compact disc.
Figure 2:
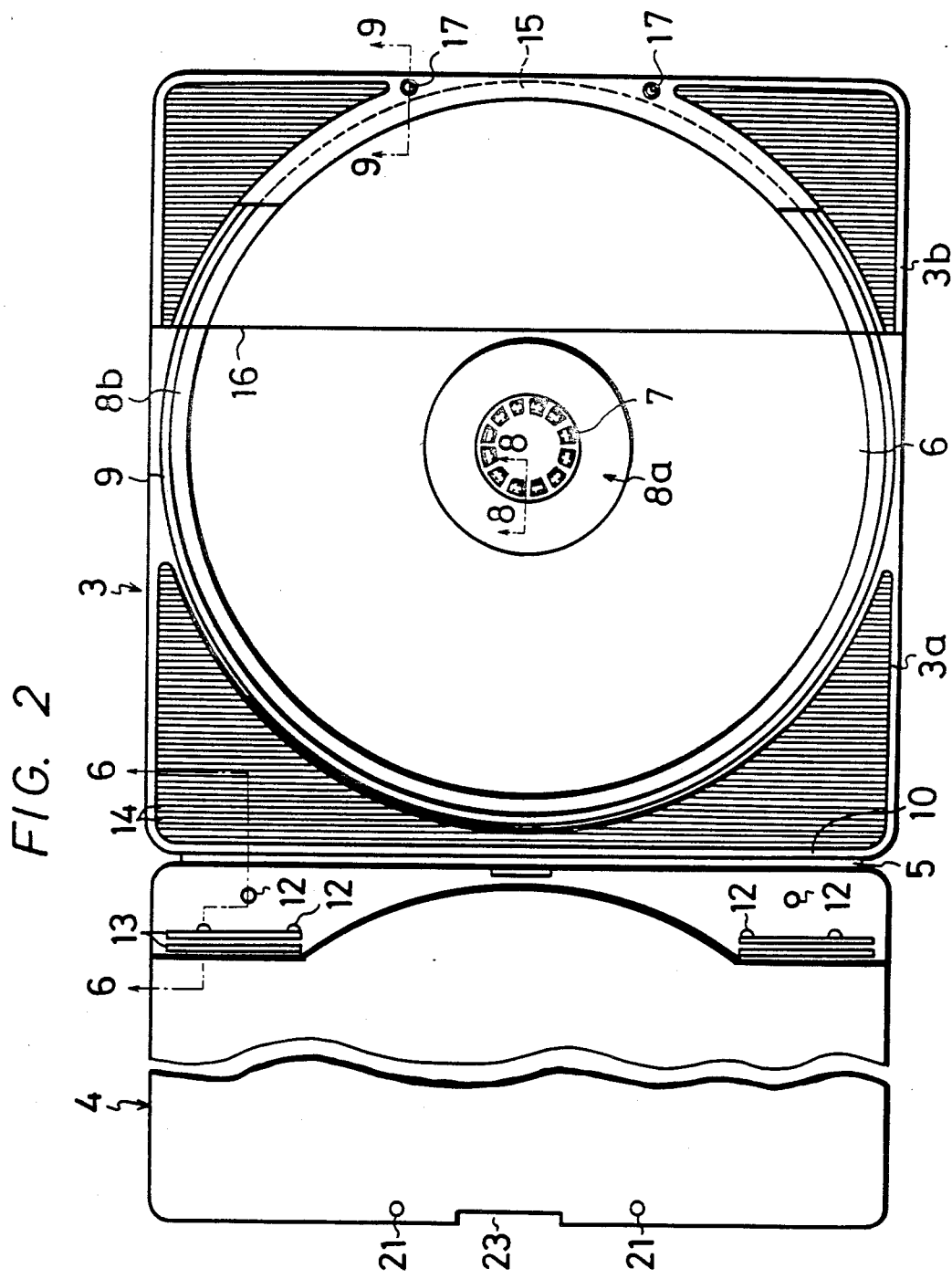
FIG. 2 is a plan view of the disc package of FIG. 1, the disc package being shown in the open position.
Figure 6:
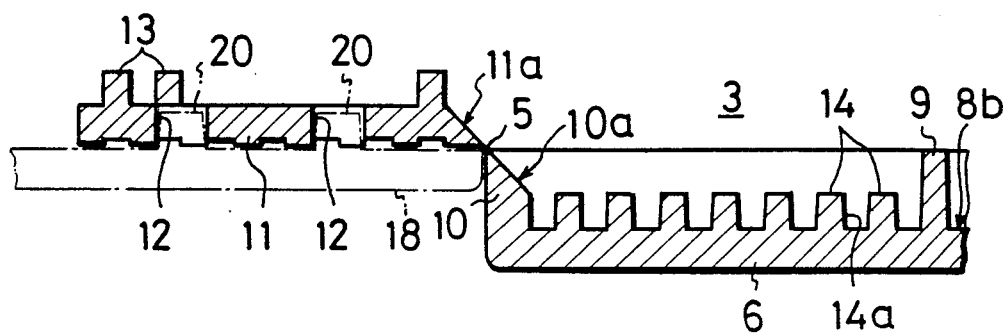
FIG. 6 is an enlarged sectional view taken substantially along the 6—6 of FIG. 2 and looking in the direction of the arrows.
Figure 7:
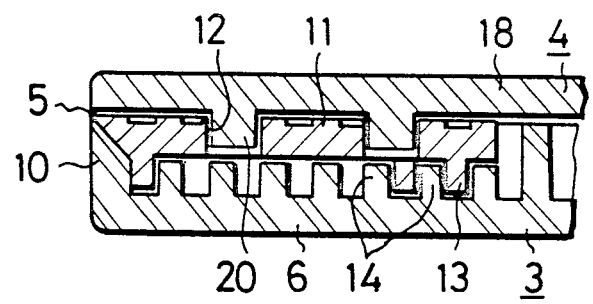
FIG. 7 is an enlarged sectional view similar to FIG. 6 but showing the closed position of the structure thereof.
Figure 8:
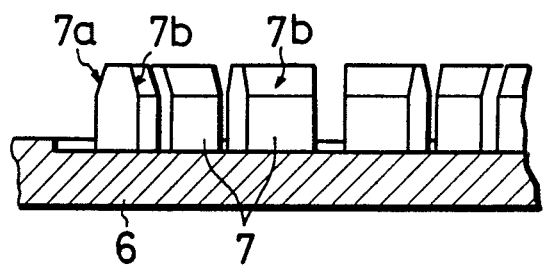
FIG. 8 is an enlarged sectional view taken substantially along the line 8—8 of FIG. 2 and looking in the direction of the arrows.

FIG. 1 shows a compact disc 1 held within a first embodiment of a disc package 2 constructed in accordance with the invention. The package 2 is made of plastic and is shown in the open position in which the disc 1 is exposed so that it can be loaded into a disc player (not shown). The package 2 comprises an articulated main body 3, which functions as a tray member, and a cover 4. The cover 4 may be transparent and is connected to the body 3 by a cover hinge 5 for relative pivoting movement about a first axis. The body 3 is rectangular (preferably substantially square), as FIG. 2 shows, and is a little larger on each side of the rectangle or square than the diameter of the disc 1. The thickness of the package 2 is only about half as great as that of the conventional package mentioned above, so that volumetrically the package 2 is substantially smaller than the conventional package. The body 3 has a base plate member 6 (FIGS. 2–4 and 6–8) formed near a central portion thereof with a ring-shaped central holding member 7 for engagement within a center hole of the disc 1. The central holding member 7, as best shown in FIG. 8, comprises a plurality of flexible projections having tapered portions 7a and 7b insertable into the center hole of a disc, and cooperating with a projection 19 (FIG. 5) formed on the cover 4.

As FIGS. 2, 3 and 4 show, ring-shaped disc support surfaces 8a and 8b extend from the base plate 6 and around the central holding member 7 and an outer part of the base plate 6, respectively, so as to support or engage radially inner and outer portions of the disc 1. The plate 6 is also formed with a ring-shaped projection 9 (FIGS. 2 and 4) on the radially outer side of the support surface 8b in order to position and protect the outer edge of the disc.

An end rib 10 is formed on the plate 6, as shown in FIGS. 2, 4, 6 and 7, and has an upper surface 10a (FIG. 6) which tapers upwardly and radially outwardly. A flap 11 is connected to the rib 10 by the hinge 5. An inner part of the flap 11 (i.e. a portion adjacent to the end rib 10) has a tapered surface 11a complemental to the tapered surface 10a and engageable with the surface 10a when the flap is pivoted to the closed position of FIG. 7. Openings 12 are formed in the flap 11 in order to receive pins 20 formed on the cover 4, so that the cover 4 is secured to the flap 11. The flap 11 is formed with ribs 13 engageable in grooves 14a formed between ribs 14 extending from the plate 6, thereby facilitating a secure enclosure of the disc 1 adjacent to the cover hinge 5.

The main body 3 comprises a first part 3a having the central holding member 7 and a second part 3b, the first and second parts 3a and 3b being connected to each other by a body hinge 16 as shown in FIGS. 1–4, so that the body 3 is articulate. That is, the first and second parts 3a and 3b are capable of a relative pivoting movement about a second axis, which is formed by the hinge 16. This second axis is parallel to the first axis, which is formed by the hinge 5 and about which the cover 4 and body 3 pivot. The second part 3b is formed on the side thereof remote from the hinges 5 and 16 with a peripheral holding or gripping member 15 for engaging the disc along the periphery thereof. The holder 15 is arcuate (FIG. 2) and concentric with the central holding member 7 and lies in a plane substantially parallel to the plane of the support surface 8b in order efficiently to grip an outer edge of the disc 1.

Figure 9:
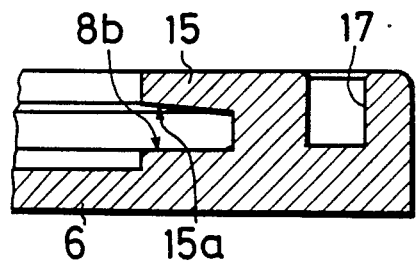
FIG. 9 is an enlarged sectional view taken substantially along the line 9—9 of FIG. 2 and looking in the direction of the arrows.
Figure 10:
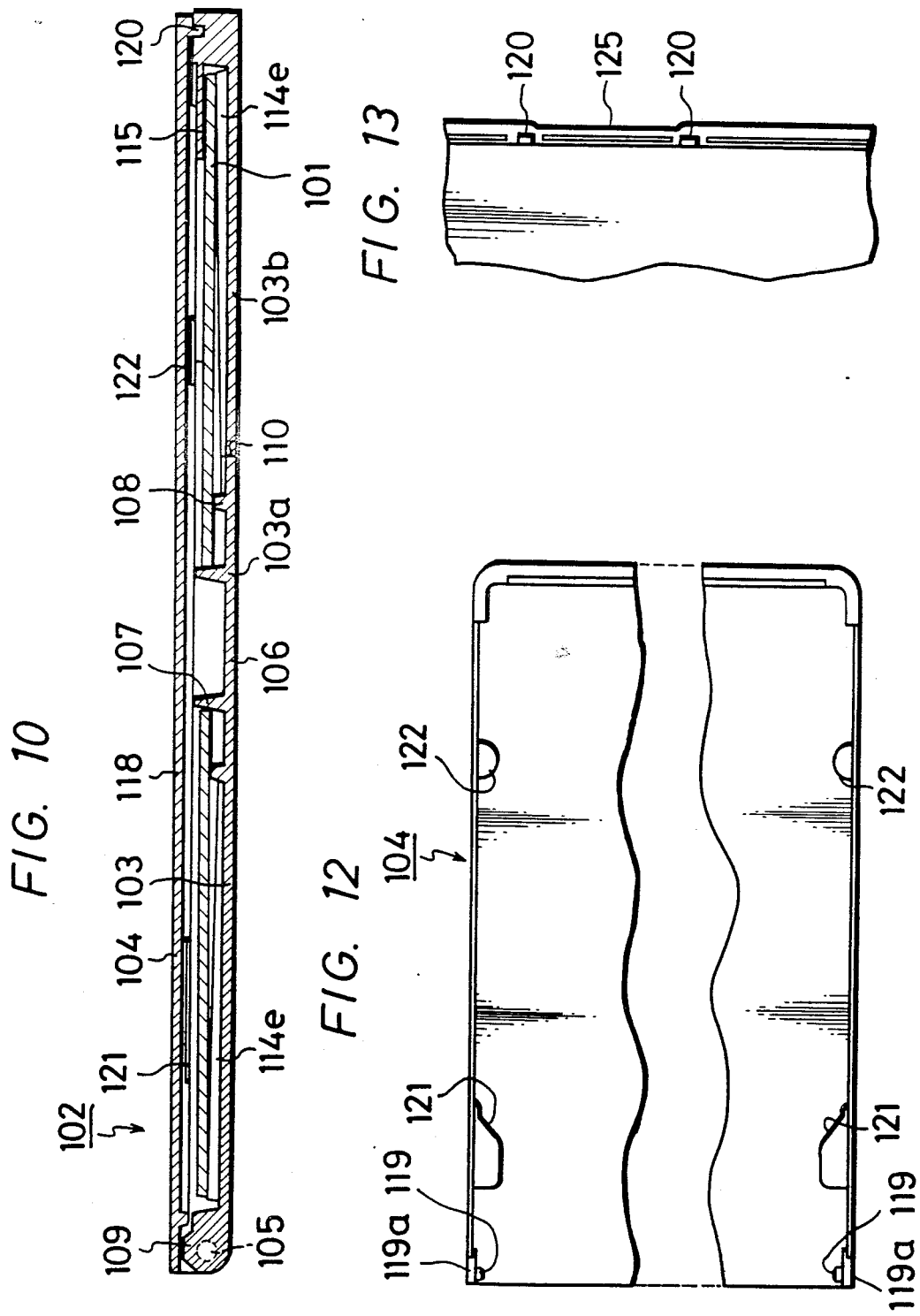
FIG. 10 is a cross-sectional view of a second embodiment of a disc package according to the invention.
Figure 11:
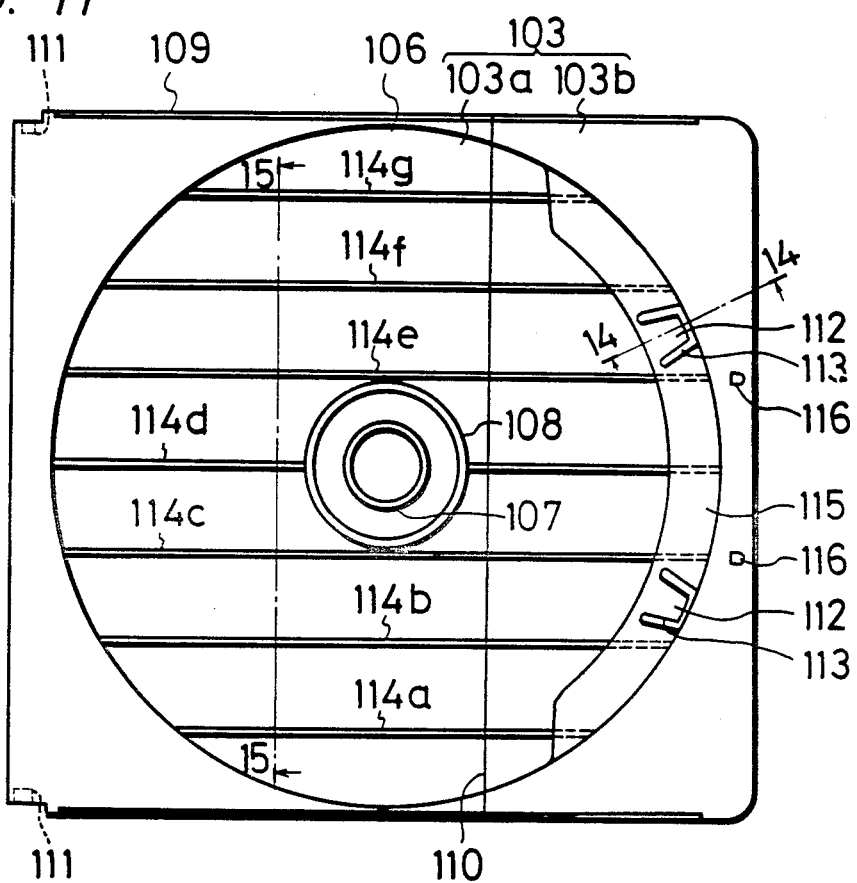
FIG. 11 is a plan view of a main body portion of the disc package of FIG. 10.
Figure 14:
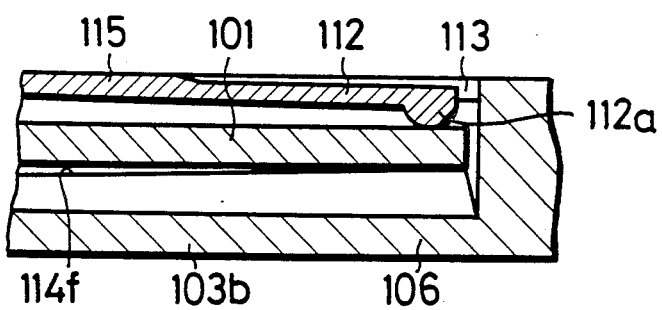
FIG. 14 is an enlarged cross-sectional view taken substantially along the line 14—14 of FIG. 11 and looking in the direction of the arrows.
Figure 15:
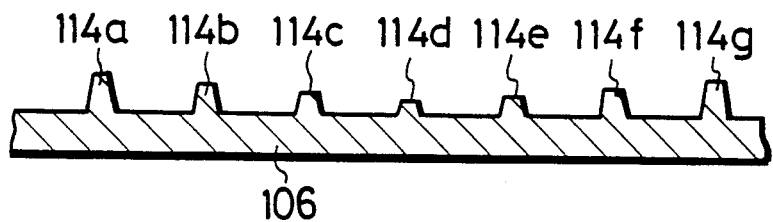
FIG. 15 is an exaggerated cross-sectional view taken substantially along the line 15—15 of FIG. 11 and looking in the direction of the arrows.

The cover 4 comprises a substantially flat plate 18, as shown in FIG. 5, and is formed with pins 20 which are insertable in the openings 12 in the flap 11. A ring-shaped projection 19 formed on the plate 18 is engageable within the tapered surfaces 7b (FIG. 8) of the central holding member 7 when the cover 4 is closed. Similarly, pins 21 formed on the plate 18 are engageable in openings 17 (FIGS. 2, 5 and 9) formed on the second part 3b of the main body 3. The cover plate is formed with a recess 23 at its free end (FIG. 2) to facilitate insertion of a fingernail or thumbnail in order to open the disc package.

When the disc 1 is inserted in the package 2, the outer edge of the disc 1 is supported by the engagement surface 8b, and a sector of the outer edge of the disc 1 is accommodated within the holder 15. The holder 15 is formed with an upper surface 15a (FIG. 9) which tapers radially outwardly and downwardly to ensure a snug fit with the outer edge of the disc. The inner portion of the disc 1 engages the central holding member 7 and surface 8a, and, when the cover 4 is closed, the projection 19 enters and spreads out the flexible central holding member 7, so that the latter is securely engaged within the center hole of the disc 1 all around the circumference of the center hole. Accordingly, the disc 1 is accommodated, protected and well supported in the body 3 and will not accidently become dislodged therefrom.

In order to open the cover 4, i.e. pivot it away from the main body 3, the pins 21 are disengaged from the respective openings 17 by, for example, inserting a fingernail or thumbnail in the depression 23 and pulling or twisting. As soon as the projection 19 on the plate 18 is withdrawn from the flexible central holding member 7, the latter is no longer spread to securely engage the center hole of the disc 1. Thus when the cover 4 is rotated to the wide open position by hand or by gravity, the base plate 6 folds so that the first and second parts 3a and 3b form an angle with each other, as FIGS. 1 and 4 show. A sector of the outer edge of the disc 1 remains securely held or gripped by the peripheral holding member 15 and support surface 8b so that the disc 1 remains with the second part 3b of the body 3. Since the main part of the disc, including the center thereof where the hole is formed, is free of the body 3, it can easily be loaded or inserted into a disc player without direct touching of the disc by the hand. Accordingly, finger marks and smudges on the disc when the disc is removed from the package are avoided.

FIGS. 10 to 15 show a second embodiment of the invention. In this embodiment a disc package 102 comprises a main body portion 103 and a cover 104, the cover 104 being connected to the main body 103 by a cover hinge 105, which enables relative pivoting of the cover 104 and body 103 about a first axis. The hinge 105 comprises pins 119 (FIG. 12) integral with the cover 104 and engageable in holes 111 (FIG. 11) formed in the body 103. The pins 119 project from flanges 119a which are formed at opposite sides of the cover 104. The flanges 119a extend at right angles to the plane in which the cover plate 118 of the cover 104 lies, and the pins 119 extend towards each other along an axis parallel to such plane. The holes 111 are formed at opposite sides of the body 103 in a side wall 109 which extends along the edge of the body 103. The cover 104 is formed near its edge opposite the hinge 105 with projections 120 (FIGS. 10 and 13) which are received in apertures 116 when the cover 104 is closed.

The body portion 103 is formed with a plurality of ribs 114a to 114g (FIGS. 10, 11 and 15) projecting from a base plate 106 in order to reinforce the plate 106 and support the accommodated disc. The heights of the ribs 114a to 114g in the vicinity of the radially outer portions of the enclosed disc are greater than the heights of the ribs in the vicinity of the radially inner portions of the enclosed disc, and the tops of the ribs 104a to 104g collectively define a spherical surface.

The base plate 106 is also formed with a ring-shaped central holding member 107 (FIGS. 10 and 11) which can be inserted through the center hole of a disc 101 and a ring-shaped rib 108 for receiving and supporting a radially inner portion of the disc. The height of the rib 108 is the same as the height of the radially outer portions of the ribs 114a to 114g, so that the disc 101 (FIG. 14) is engaged from below only at the outer and inner edges thereof by the ribs 114a–114g and 108. This avoids scratching the part of the disc 101 which contains the recorded signal.

The body 103 is articulate and comprises first and second parts 103a and 103b. The first part 103a includes the central holding member 107, and a body hinge 110 connects the parts 103a and 103b so that the first body part 103a can rotate, fold or pivot about a second axis with respect to the second body part 103b (FIGS. 10 and 11), as in the case of the first embodiment. The axis of rotation provided by the body hinge 110 is parallel to the axis of rotation provided by the cover hinge 105. The second body part 103b comprises an arcuate peripheral holding member 115 for gripping or holding the disc 101, particularly when the package is in the open position. In this embodiment, the holding member 115 is formed with slits 113 (FIGS. 11 and 14) to form flexible pressing parts 112 which have projections 112a (FIG. 14) for depressing the disc edge. The pressing parts 112 are resilient and have a spring-like action. Thus, the disc 101 is urged against the top surfaces of the ribs 104a to 104g by the spring force of the pressing parts 112, so that it is fixed or held securely when the cover 104 is closed and can also be securely held when the cover 104 is opened.

As FIG. 12 shows, paper holders 121 and 122 are provided, whereby information, pictures, etc., relating to the disc can be held. As FIG. 13 shows, a depression or recess 125 is formed for engagement of a fingernail or thumbnail to facilitate opening of the disc package.

Thus there is provided in accordance with the invention a novel and highly-effective disc package that remedies the principal drawbacks of conventional disc packages and that, in particular, is smaller than a conventional disc package, inexpensive to manufacture, and easily opened using only one hand, that avoids the danger of placing finger marks or smudges on the disc, and that facilitates loading of the disc into a disc player. The disc package of the invention is thus ideally suited, for example, to storing compact discs for playing by the driver of a car while operating the car.

Many modifications of the preferred embodiments of the disc package disclosed herein will readily occur to those skilled in the art. For example, the arc subtended by the holding member 15 or 115, the amount of spring force provided by the peripheral holding members, and the relative sizes of the parts 3a and 3b or 103a and 103b can be varied without departing from the spirit and scope of the invention. Accordingly, the invention includes all structure that is within the scope of the appended claims.

We claim:

1. A disc package for enclosing a record disc formed with a center hole, said disc package being capable of opening to permit said disc to be withdrawn therefrom for insertion into a disc player and comprising:
   a body for accommodating said record disc;
   a cover; and
   cover hinge means connecting said cover to said body for relative pivoting movement about a first axis;
   said body comprising a first part adjacent to said cover hinge means, a second part spaced away from said cover hinge means, body hinge means connecting said first and second body parts for relative pivoting movement about a second axis, a central holding member formed on said first body part for engagement in said center hole of said disc, and a peripheral holding member formed on a side of said second body part remote from said body hinge means for gripping an outer edge of said disc;
   whereby said disc package can be moved between a closed position wherein it securely grips, encloses and protects said disc and an open position wherein said disc is free of said cover, of said first body part and of said central holding member and is held only by said second body part, including said peripheral holding member, so that, without being touched by a hand, it is easily inserted into a disc player.

2. A disc package according to claim 1; wherein said peripheral holding member is resiliently engageable with said disc.

3. A disc package according to claim 1; wherein each of said first and second body parts is formed with projecting means respectively engageable with radially inner and radially outer portions of said disc, whereby said disc is engaged only at portions thereof devoid of recorded signals.

4. A disc package according to claim 1; wherein said body hinge means is positioned between said central holding member and said peripheral holding member.

5. A disc package according to claim 4; wherein said peripheral holding member has a surface which tapers radially outwardly and downwardly to ensure a snug fit with the outer edge of said disc.

6. A disc package according to claim 1; wherein said peripheral holding member is formed with at least one flexible pressing part which provides a spring force pressing against said disc for securing said disc in place.

7. A disc package according to claim 6; wherein said peripheral holding member is formed with slit means defining said flexible pressing part.

8. A disc package according to claim 7; wherein said flexible pressing part is formed with a projection engageable with said disc for depressing said disc.

9. A disc package according to claim 1; wherein said body is formed with a plurality of ribs for reinforcing said first and second body parts, the heights of said ribs in the vicinity of the radially outer portion of said disc being greater than the heights of said ribs in the vicinity of the radially inner portions of said disc.

10. A disc package according to claim 9; wherein the tops of said ribs collectively define a spherical surface.

11. A disc package according to claim 1; wherein said first and second axes are parallel.

* * * * *